(12) United States Patent
Qiu

(10) Patent No.: US 11,218,328 B2
(45) Date of Patent: *Jan. 4, 2022

(54) DIGITAL CERTIFICATE MANAGEMENT METHOD AND APPARATUS, AND ELECTRONIC DEVICE

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,119

(22) Filed: Jul. 2, 2021

(65) Prior Publication Data
US 2021/0336800 A1    Oct. 28, 2021

Related U.S. Application Data

(63) Continuation of application No. 16/045,107, filed on Jul. 25, 2018, now Pat. No. 11,057,222.

(30) Foreign Application Priority Data

Jul. 26, 2017 (CN) .......................... 201710617611.4

(51) Int. Cl.
*H04L 9/32* (2006.01)
*H04L 29/06* (2006.01)
(Continued)

(52) U.S. Cl.
CPC ..... *H04L 9/3265* (2013.01); *G06Q 20/38215* (2013.01); *G06Q 20/401* (2013.01);
(Continued)

(58) Field of Classification Search
CPC ................................ G06Q 20/38215
See application file for complete search history.

(56) References Cited

U.S. PATENT DOCUMENTS 9,635,000 B1    4/2017  Muftic
9,680,872 B1    6/2017  Roth
(Continued)

FOREIGN PATENT DOCUMENTS

CN    105591753    5/2016
CN    106385315    2/2017
(Continued)

OTHER PUBLICATIONS

Google Patents Translation of CN 106385315A (Year: 2017).*
(Continued)

*Primary Examiner* — Luu T Pham
*Assistant Examiner* — James J Wilcox
(74) *Attorney, Agent, or Firm* — Fish & Richardson P.C.

(57) ABSTRACT

Implementations of the present disclosure provide techniques to improve security in blockchain networks. In some implementations, a linking request is received from a node. The node requests to be linked to a blockchain network. The linking request includes a digital code. One or more consensus verification messages are received from one or more blockchain nodes of the blockchain network. Each consensus verification message indicates whether a respective blockchain node approves or denies the linking request. A consensus verification result is determined based on the one or more consensus verification messages. In response to determining that the linking request is approved by the one or more blockchain nodes, the digital code is stored into the blockchain network as a digital certificate of the node.

3 Claims, 13 Drawing Sheets

(51) Int. Cl.
*H04L 9/00* (2006.01)
*G06Q 20/40* (2012.01)
*G06Q 20/38* (2012.01)
*H04L 9/06* (2006.01)

(52) U.S. Cl.
CPC ............ *H04L 9/006* (2013.01); *H04L 9/0637* (2013.01); *H04L 9/3239* (2013.01); *H04L 9/3268* (2013.01); *H04L 63/0823* (2013.01); *H04L 2209/38* (2013.01)

(56) References Cited

U.S. PATENT DOCUMENTS

| | | | |
|---|---|---|---|
| 9,998,286 B1 | 6/2018 | Ramathal | |
| 10,547,457 B1 | 1/2020 | Duccini et al. | |
| 10,805,067 B1 * | 10/2020 | Griffin | H04L 9/0643 |
| 2008/0091952 A1 | 4/2008 | Sumner et al. | |
| 2010/0138652 A1 | 6/2010 | Sela et al. | |
| 2014/0281502 A1 * | 9/2014 | Keung Chan | H04L 9/3263 713/157 |
| 2014/0344567 A1 | 11/2014 | Grajek | |
| 2015/0256346 A1 * | 9/2015 | Tseng | H04L 9/0861 713/158 |
| 2015/0356523 A1 | 12/2015 | Madden | |
| 2016/0224949 A1 | 8/2016 | Thomas | |
| 2016/0260169 A1 | 9/2016 | Arnold | |
| 2016/0275461 A1 | 9/2016 | Sprague et al. | |
| 2016/0300234 A1 | 10/2016 | Moss | |
| 2016/0342988 A1 | 11/2016 | Thomas | |
| 2016/0379212 A1 | 12/2016 | Bowman et al. | |
| 2017/0075941 A1 | 3/2017 | Finlow-Bates | |
| 2017/0103468 A1 | 4/2017 | Orsini | |
| 2017/0140394 A1 | 5/2017 | Cao | |
| 2017/0149819 A1 | 5/2017 | Androulaki et al. | |
| 2017/0228734 A1 | 8/2017 | Kurian | |
| 2017/0244721 A1 | 8/2017 | Kurian et al. | |
| 2017/0279855 A1 | 9/2017 | Roth | |
| 2017/0316390 A1 | 11/2017 | Smith | |
| 2017/0330180 A1 | 11/2017 | Song | |
| 2017/0338967 A1 * | 11/2017 | Lewison | H04L 9/321 |
| 2017/0344987 A1 | 11/2017 | Davis | |
| 2017/0346637 A1 | 11/2017 | Zhang | |
| 2017/0346639 A1 * | 11/2017 | Muftic | H04L 9/3263 |
| 2018/0019993 A1 | 1/2018 | Kravitz et al. | |
| 2018/0060496 A1 | 3/2018 | Bulleit et al. | |
| 2018/0082290 A1 * | 3/2018 | Allen | H04L 63/083 |
| 2018/0096121 A1 | 4/2018 | Goeringer et al. | |
| 2018/0097638 A1 * | 4/2018 | Haldenby | G06K 9/00201 |
| 2018/0101560 A1 | 4/2018 | Christidis | |
| 2018/0117446 A1 | 5/2018 | Tran et al. | |
| 2018/0130034 A1 | 5/2018 | Taylor | |
| 2018/0130050 A1 | 5/2018 | Taylor | |
| 2018/0117447 A1 | 7/2018 | Tran et al. | |
| 2018/0204191 A1 | 7/2018 | Wilson et al. | |
| 2018/0204192 A1 | 7/2018 | Whaley et al. | |
| 2018/0225661 A1 | 8/2018 | Russinovich | |
| 2018/0227293 A1 * | 8/2018 | Uhr | H04L 9/0643 |
| 2018/0241573 A1 * | 8/2018 | Ramathal | G16H 30/20 |
| 2018/0253539 A1 | 9/2018 | Minter | |
| 2018/0276666 A1 | 9/2018 | Haldenby et al. | |
| 2019/0005470 A1 | 1/2019 | Uhr | G06Q 20/02 |
| 2019/0028277 A1 | 1/2019 | Jayachandran et al. | |
| 2019/0036710 A1 | 1/2019 | Qiu | |
| 2019/0199535 A1 * | 6/2019 | Falk | H04L 9/0643 |
| 2019/0228407 A1 | 7/2019 | Wu | |
| 2019/0238344 A1 * | 8/2019 | Kaga | H04L 9/0891 |
| 2019/0384748 A1 | 12/2019 | Roennow | |
| 2019/0394047 A1 | 12/2019 | Karanne | |
| 2020/0104294 A1 | 4/2020 | Alas | |
| 2020/0127853 A1 | 4/2020 | Qiu | |
| 2020/0374135 A1 * | 11/2020 | Lu | H04L 9/008 |

FOREIGN PATENT DOCUMENTS

| | | | | |
|---|---|---|---|---|
| CN | 106385315 A | * | 2/2017 | G06Q 20/12 |
| CN | 106651331 | | 5/2017 | |
| CN | 106789090 | | 5/2017 | |
| CN | 106815725 A | * | 6/2017 | G06Q 20/12 |
| EP | 3188105 A4 | * | 7/2017 | G06Q 20/12 |
| KR | 20110029036 | | 3/2011 | |
| TW | M543413 | | 6/2017 | |

OTHER PUBLICATIONS

Google Patents Translation of CN 106815725A (Year: 2017).*
Longo et al ("Longo," On the Security of the Blockchain Bix Protocol and Certificates, Jul. 29, 2016, pp. 1-16 (Year: 2016).*
Cooper et al; "RFC 5280—Internet X.509 Public Key Infrastructure Certificate and Certificate Revocation List (CRL) Profile". Aug. 25, 2015; 151 pages.
Crosby et al., "BlockChain Technology: Beyond Bitcoin," Sutardja Center for Entrepreneurship & Technology Technical Report, Oct. 16, 2015, 35 pages.
Debus, "Consensus Methods in Blockchain Systems", Frankfurt School Blockchain Center, May 2017, 58 pages.
Kwon; "Tendermint: Consensus Without Mining"; Mar. 19, 2015; 11 pages.
Nakamoto, "Bitcoin: A Peer-to-Peer Electronic Cash System," www.bitcoin.org, 2005, 9 pages.
Patel et al, "Blockchain Exhumed," pp. 1-12, IEEE, 2017.
PCT International Preliminary Report on Patentability in Internaitonal Application No. PCT/US2018/043901, dated Jul. 26, 2019, 10 pages.
PCT International Search Report and Written Opinion of the International Searching Authority issued International Application No. PCT/US2018/043901 dated Sep. 20, 2018; 14 pages.
Watanabe et al., ""Blockchain Contract: A Complete Consensus using Blockchain,"" 2015 IEEE 4th Global Conference on Consumer.

* cited by examiner

DIGITAL CERTIFICATE MANAGEMENT METHOD AND APPARATUS, AND ELECTRONIC DEVICE

This application is a continuation of and claims the benefit of priority of U.S. patent application Ser. No. 16/045,107, filed on Jul. 25, 2018, which claims priority to Chinese Patent Application No. 201710617611.4, filed on Jul. 26, 2017, which is hereby incorporated by reference in its entirety.

TECHNICAL FIELD

The present application relates to the field of computer technologies, and in particular, to a digital certificate management method and apparatus, and an electronic device.

BACKGROUND

With the development of computer technologies, the blockchain technology (also referred to as the distributed ledger technology) has been favored for its decentralization, openness and transparency, non-tampering, and trustiness, and is widely applied to many fields such as intelligent contracts, securities transactions, E-commerce, the Internet of Things, social communication, file storage, existence proofs, identity verification, and equity crowdsourcing.

Currently, a blockchain system can be mainly divided into three types: a public blockchain (Public Blockchain), a private blockchain (Private Blockchain), and a consortium blockchain (Consortium Blockchain). The three types of blockchains mainly differ in openness objects. The public blockchain can be open to all individuals, the private blockchain is only open to an individual or entity organization, and the consortium blockchain is between the public blockchain and the private blockchain, open to a specific individual or entity organization, but not to other individual or entity organizations.

In a blockchain, especially in the consortium blockchain for a specific organization, to improve communication security, a Certificate Authority (CA) center is usually designed to issue a node certificate to each node that participates in blockchain communication, so that only nodes having an authorized certificate can communicate with each other. In the existing technology, both the issued node certificate and information about certificate validity such as a certificate revocation list are stored in a server of the CA center. When nodes in the blockchain need to communicate with each other, information about the certificate validity stored in the CA center is called and queried, so as to confirm the certificate validity and complete communication process verification. The main drawbacks of this approach are:

Both the node digital certificate and the information about the certificate validity are stored in the CA center. Once the CA center is hacked, a hacker can arbitrarily modify the information about the certificate validity. For example, the hacker can tamper with the certificate revocation list to recover a revoked certificate back to normal. The hacker can further illegally join the blockchain by using a previously revoked problematic certificate, and the node in the blockchain can confirm the certificate validity based on the tampered information, thereby threatening the security of the blockchain. Moreover, a private key of the CA center can also be hacked by the hacker, and the hacker can arbitrarily issue the digital certificate, threatening the security of a blockchain network.

SUMMARY

Implementations of the present application provide a digital certificate management method, apparatus, and a corresponding electronic device, to improve the security of a blockchain network.

The following technical solutions are used in the implementations of the present application:

According to a first aspect, an implementation of the present application provides a digital certificate management method, including: receiving a digital certificate linking request sent by a node in a blockchain, where the digital certificate linking request includes a to-be-verified digital certificate that is generated by the node through signing by using a private key, and is used to request to write the to-be-verified digital certificate into the blockchain; determining a consensus verification result of the to-be-verified digital certificate of the node; and determining, based on the consensus verification result, whether to write the to-be-verified digital certificate into the blockchain.

Preferably, in the digital certificate management method provided in the first aspect, the determining a consensus verification result of the to-be-verified digital certificate of the node includes: determining verification results of nodes participating in consensus verification in the blockchain; determining the number of first nodes and/or the number of second nodes in the nodes participating in consensus verification, where a verification result of the first node is passing the consensus verification, and a verification result of the second node is not passing the consensus verification; and determining the consensus verification result based on the number of first nodes and/or the number of second nodes.

Preferably, in the digital certificate management method provided in the first aspect, the determining the consensus verification result based on the number of first nodes includes: when the number of first nodes satisfies a first predetermined condition, determining that the consensus verification result is passing the consensus verification; and the first predetermined condition includes one or more of the following: the number of first nodes reaches a first predetermined threshold; a ratio of the number of first nodes to the number of nodes participating in consensus verification reaches a second predetermined threshold; and a ratio of the number of first nodes to the number of nodes in the blockchain reaches a third predetermined threshold.

Preferably, in the digital certificate management method provided in the first aspect, the determining, based on the consensus verification result, whether to write the to-be-verified digital certificate into the blockchain includes: writing the to-be-verified digital certificate into the blockchain when the consensus verification result is passing the consensus verification.

Preferably, in the digital certificate management method provided in the first aspect, the method further includes: receiving a digital certificate revocation request sent by the node in the blockchain, where the digital certificate revocation request includes a digital certificate of a target node that is requested to be revoked; determining a consensus verification result of the digital certificate of the target node; and determining, based on the consensus verification result, whether to revoke the digital certificate of the target node.

According to a second aspect, an implementation of the present application provides a digital certificate management method, including: receiving a digital certificate revocation request sent by a node in a blockchain, where the digital certificate revocation request includes a digital certificate of a target node that is requested to be revoked; determining a consensus verification result of the digital certificate of the target node; and determining, based on the consensus verification result, whether to revoke the digital certificate of the target node in the blockchain.

Preferably, in the digital certificate management method provided in the second aspect, the determining a consensus verification result of the digital certificate of the target node includes: determining verification results of nodes participating in consensus verification in the blockchain; determining the number of first nodes and/or the number of second nodes in the nodes participating in consensus verification, where a verification result of the first node is passing the consensus verification, and a verification result of the second node is not passing the consensus verification; and determining the consensus verification result based on the number of first nodes and/or the number of second nodes.

Preferably, in the digital certificate management method provided in the second aspect, the determining the consensus verification result based on the number of first nodes includes: when the number of first nodes satisfies a first predetermined condition, determining that the consensus verification result is passing the consensus verification; and the first predetermined condition includes one or more of the following: the number of first nodes reaches a first predetermined threshold; a ratio of the number of first nodes to the number of nodes participating in consensus verification reaches a second predetermined threshold; and a ratio of the number of first nodes to the number of nodes in the blockchain reaches a third predetermined threshold.

Preferably, in the digital certificate management method provided in the second aspect, the determining, based on the consensus verification result, whether to revoke the digital certificate of the target node in the blockchain includes: revoking the digital certificate of the target node in the blockchain when the consensus verification result is passing the consensus verification.

According to a third aspect, an implementation of the present application provides a digital certificate management method, including: sending, by a node in a blockchain, a digital certificate linking request to the blockchain, so that the blockchain determines a consensus verification result of a to-be-verified digital certificate of the node, and determines, based on the consensus verification result, whether to write the to-be-verified digital certificate into the blockchain, where the digital certificate linking request includes the to-be-verified digital certificate that is generated by the node through signing by using a private key, and is used to request to write the to-be-verified digital certificate into the blockchain.

According to a fourth aspect, an implementation of the present application provides a digital certificate management method, including: sending, by a node in a blockchain, a digital certificate revocation request to the blockchain, so that the blockchain determines a consensus verification result of a digital certificate of a target node, and determines, based on the consensus verification result, whether to revoke the digital certificate of the target node in the blockchain, where the digital certificate revocation request includes the digital certificate of the target node that is requested to be revoked.

According to a fifth aspect, an implementation of the present application provides a digital certificate management apparatus, where the apparatus is applied to a blockchain and includes: a request receiving module, configured to receive a digital certificate linking request sent by a node in the blockchain, where the digital certificate linking request includes a to-be-verified digital certificate that is generated by the node through signing by using a private key, and is used to request to write the to-be-verified digital certificate into the blockchain; a consensus verification result determining module, configured to determine a consensus verification result of the to-be-verified digital certificate of the node; and a certificate management module, configured to determine, based on the consensus verification result, whether to write the to-be-verified digital certificate into the blockchain.

According to a sixth aspect, an implementation of the present application provides an electronic device, where the electronic device is applied to a blockchain and includes: a processor; and a storage, configured to store a computer executable instruction, where when the executable instruction is being executed, the processor performs the following operations: receiving a digital certificate linking request sent by a node in the blockchain, where the digital certificate linking request includes a to-be-verified digital certificate that is generated by the node through signing by using a private key, and is used to request to write the to-be-verified digital certificate into the blockchain; determining a consensus verification result of the to-be-verified digital certificate of the node; and determining, based on the consensus verification result, whether to write the to-be-verified digital certificate into the blockchain.

According to a seventh aspect, an implementation of the present application provides a digital certificate management apparatus, where the apparatus is applied to a blockchain and includes: a request receiving module, configured to receive a digital certificate revocation request sent by a node in the blockchain, where the digital certificate revocation request includes a digital certificate of a target node that is requested to be revoked; a consensus verification result determining module, configured to determine a consensus verification result of the digital certificate of the target node; and a certificate management module, configured to determine, based on the consensus verification result, whether to revoke the digital certificate of the target node in the blockchain.

According to an eighth aspect, an implementation of the present application provides an electronic device, where the electronic device is applied to a blockchain and includes: a processor; and a storage, configured to store a computer executable instruction, where when the executable instruction is being executed, the processor performs the following operations: receiving a digital certificate revocation request sent by a node in the blockchain, where the digital certificate revocation request includes a digital certificate of a target node that is requested to be revoked; determining a consensus verification result of the digital certificate of the target node; and determining, based on the consensus verification result, whether to revoke the digital certificate of the target node in the blockchain.

According to a ninth aspect, an implementation of the present application provides a digital certificate management apparatus, where the apparatus is applied to a node in a blockchain and includes: a request initiation module, configured to send a digital certificate linking request to the blockchain, so that the blockchain determines a consensus verification result of a to-be-verified digital certificate of the node, and determines, based on the consensus verification result, whether to write the to-be-verified digital certificate into the blockchain, where the digital certificate linking request includes the to-be-verified digital certificate that is generated by the node through signing by using a private key, and is used to request to write the to-be-verified digital certificate into the blockchain.

According to a tenth aspect, an implementation of the present application provides an electronic device, where the electronic device is applied to a node in a blockchain and includes: a processor; and a storage, configured to store a computer executable instruction, where when the executable instruction is being executed, the processor performs the following operation: sending a digital certificate linking request to the blockchain, so that the blockchain determines a consensus verification result of a to-be-verified digital certificate of the node, and determines, based on the consensus verification result, whether to write the to-be-verified digital certificate into the blockchain, where the digital certificate linking request includes the to-be-verified digital certificate that is generated by the node through signing by using a private key, and is used to request to write the to-be-verified digital certificate into the blockchain.

According to an eleventh aspect, an implementation of the present application provides a digital certificate management apparatus, where the apparatus is applied to a node in a blockchain and includes: a request initiation module, configured to send a digital certificate revocation request to the blockchain, so that the blockchain determines a consensus verification result of a digital certificate of a target node, and determines, based on the consensus verification result, whether to revoke the digital certificate of the target node in the blockchain, where the digital certificate revocation request includes the digital certificate of the target node that is requested to be revoked.

According to a twelfth aspect, an implementation of the present application provides an electronic device, where the electronic device is applied to a node in a blockchain and includes: a processor; and a storage, configured to store a computer executable instruction, where when the executable instruction is being executed, the processor performs the following operation: sending a digital certificate revocation request to the blockchain, so that the blockchain determines a consensus verification result of a digital certificate of a target node, and determines, based on the consensus verification result, whether to revoke the digital certificate of the target node in the blockchain, where the digital certificate revocation request includes the digital certificate of the target node that is requested to be revoked.

The at least one technical solution used in the implementations of the present application can achieve the following beneficial effects:

In the solutions of the implementations of the present application, a function of a conventional Certificate Authority (CA) center is implemented by the blockchain. When a node in the blockchain needs to apply for a digital certificate, the node can sign, by itself using the blockchain internal private key, to generate a to-be-verified digital certificate. The digital certificate can become an authorized and valid digital certificate only after the digital certificate is linked after consensus verification is passed in a blockchain network. The process of digital certificate issuing, verification, and storage is performed in the blockchain.

In the implementations of the present application, a digital certificate that passes consensus verification can be linked, and only a linked digital certificate is an authorized digital certificate. Therefore, even if a node is attacked by a hacker, or a hacker obtains a CA private key and can randomly issue a digital certificate, the hacker cannot obtain an authorized digital certificate in the blockchain, and therefore, cannot join the blockchain network to perform unauthorized communication. Therefore, based on advantages such as decentralization, openness and transparency, and non-tampering, the digital certificate is managed by using the decentralized architecture to improve the security of the blockchain network.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute improper limitations on the present application. In the accompanying drawings.

DESCRIPTION OF EMBODIMENTS

To make the objectives, technical solutions, and advantages of the present application clearer, the following clearly and comprehensively describes the technical solutions of the present application with reference to the specific implementations and the corresponding accompanying drawings of the present application. Apparently, the described implementations are some rather than all of the implementations of the present application. Other implementations obtained by a person of ordinary skill in the art based on the implementations of the present application without creative efforts shall fall within the protection scope of the present application.

The technical solutions provided by the implementations of the present application are described in detail below with reference to the accompanying drawings.

Figure 1:
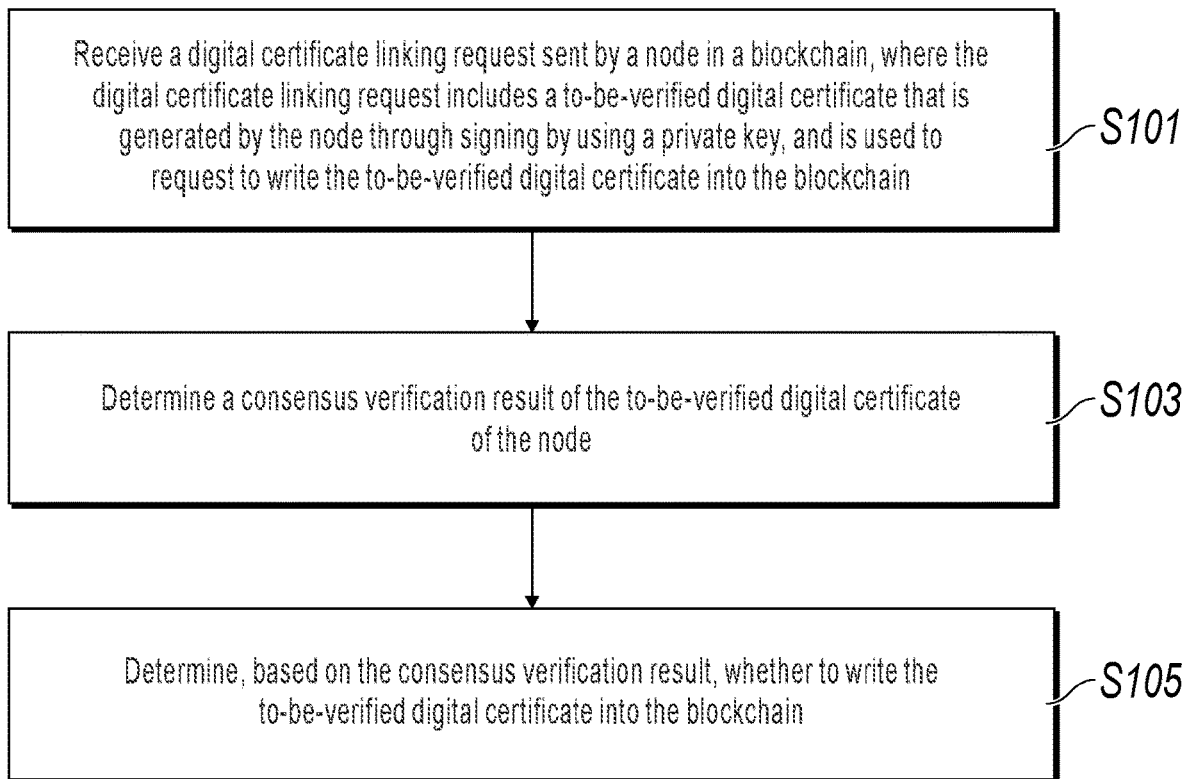
FIG. 1 is a schematic flowchart illustrating a digital certificate management method, according to an implementation of the present application.

Referring to FIG. 1, an implementation of the present application provides a digital certificate management method, including the following steps:

S101: Receive a digital certificate linking request sent by a node in a blockchain, where the digital certificate linking request includes a to-be-verified digital certificate that is generated by the node through signing by using a private key, and is used to request to write the to-be-verified digital certificate into the blockchain.

S103: Determine a consensus verification result of the to-be-verified digital certificate of the node.

S105: Determine, based on the consensus verification result, whether to write the to-be-verified digital certificate into the blockchain.

It can be understood that the node that sends the digital certificate linking request in the blockchain can be any node that wants to apply for a digital certificate in the blockchain. In the implementations of the present application, the node can sign, by itself using a private key disclosed in the blockchain, to generate the to-be-verified digital certificate, and further send the digital certificate linking request including the to-be-verified digital certificate. So that the blockchain can be requested to write the to-be-verified digital certificate into the blockchain. In specific implementations, the node can send the digital certificate linking request in a network-wide broadcast method.

The to-be-verified digital certificate that is independently issued by the node is not validated before the digital certificate is linked, but it is not different from an authorized and validated digital certificate in content and form. In the implementations of the present application, the to-be-verified digital certificate can be represented by a series of digits indicating identity information of a correspondent node, and can include content including a version number of the certificate, information about a certificate holder (for example, can be represented by identity information of a node corresponding to the certificate), information about a certificate issuer (can be the same as the information about the certificate holder here, or can reflect a source of the private key), a validity period of the certificate, a serial number of the certificate, a signature of the certificate issuer, etc.

The to-be-verified digital certificate that is independently issued by the node is not validated. Only a digital certificate written into the blockchain is an authorized digital certificate, and only a node corresponding to the authorized digital certificate can normally participate in communication of the blockchain. Therefore, in the implementations of the present application, even if the private key required for issuing the certificate is disclosed, it will not cause disorder in the management of the digital certificate management, and will not affect the security of a blockchain network. On the contrary, the authorized digital certificate is generated based on the blockchain performing step S103 to perform consensus verification of the entire network, so that the security of the blockchain network is improved.

After receiving the digital certificate linking request, the blockchain can parse the request to obtain the to-be-verified digital certificate included in the request. Then consensus verification is performed on the to-be-verified digital certificate of the node. It can be understood that consensus verification means that each node in the blockchain can participate in verification of the to-be-verified digital certificate, and the consensus verification result is determined based on a consensus mechanism of the blockchain.

Each node in the blockchain can perform specific verification based on a pre-agreed verification standard. Content for verification can be related to information in the to-be-verified digital certificate, for example, whether the validity period is expired, whether the serial number satisfies a requirement, whether identity information of an application node satisfies a requirement, etc.

Because a network delay can exist in a point-to-point network, the nodes in the blockchain can receive the digital certificate linking request at different times and can respond to the request at different speeds. Therefore, a node having a high receiving speed and a high response speed in the blockchain has more opportunities to participate in consensus verification on the to-be-verified digital certificate.

Figure 2:
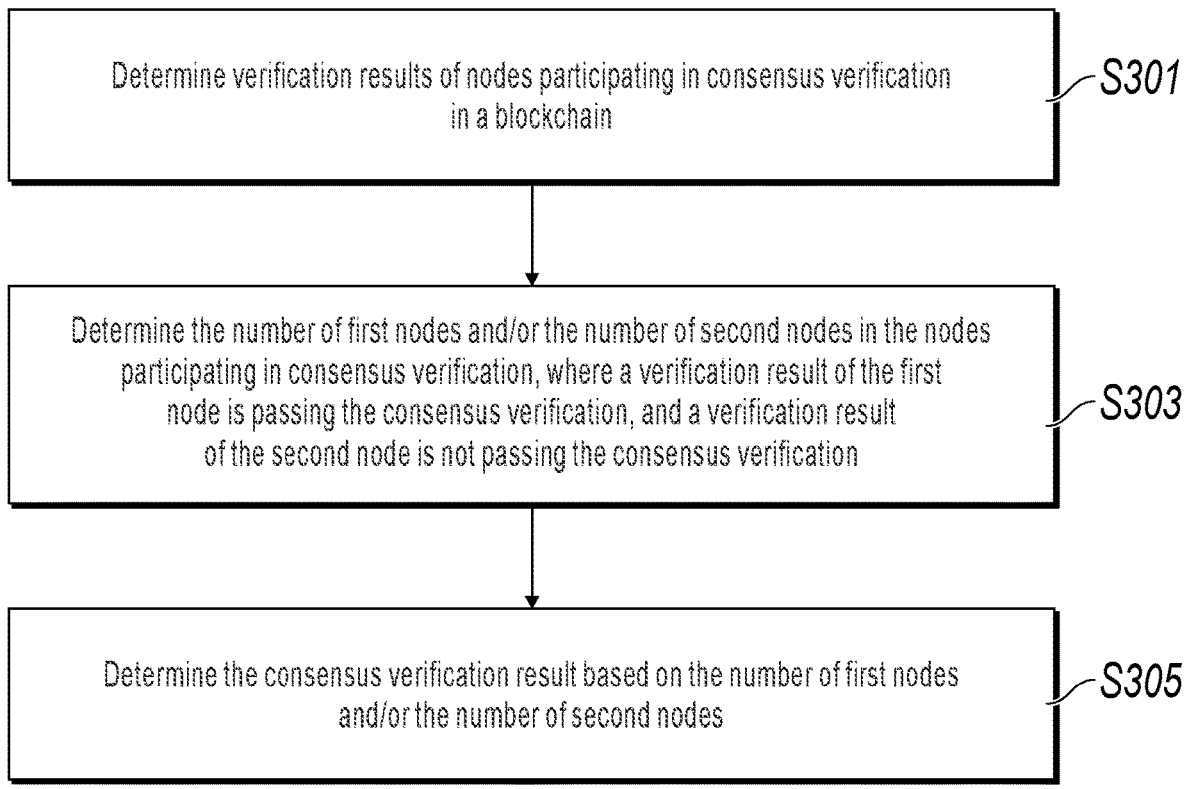
FIG. 2 is a schematic flowchart illustrating a second digital certificate management method describing S103 of FIG. 1, according to an implementation of the present application.

After completing verification on the to-be-verified digital certificate, nodes participating in consensus verification in the blockchain can send verification results to the blockchain (that is, nodes of the blockchain) in the network-wide broadcast method. Correspondingly, referring to FIG. 2, that the blockchain performs step S103 to determine the consensus verification result of the to-be-verified digital certificate of the node can include the following steps.

S301: Determine verification results of nodes participating in consensus verification in the blockchain.

It can be understood that the verification result can be "passing the consensus verification", or "not passing the consensus verification". In addition, the present step can be performed after a predetermined time from the time of broadcasting the to-be-verified digital certificate, or can be performed in real time after the start of consensus verification, or can be determined periodically, or can be performed when the number of nodes participating in consensus verification reaches a predetermined value. In the implementations of the present application, to obtain a consensus verification result that satisfies the consensus mechanism of the blockchain, each or a combination of steps S301 to S305 can be performed repeatedly, and is not limited in the implementations of the present application.

S303: Determine the number of the first nodes and/or the number of the second nodes in the nodes participating in consensus verification, where a verification result of the first node is passing the consensus verification, and a verification result of the second node is not passing the consensus verification.

Specifically, after the nodes participating in consensus verification broadcast respective verification results, the nodes can be classified, based on the verification results, into the first node whose verification result is "passing the consensus verification", and the second node whose verification result is "not passing the consensus verification". Further, either of the two types of nodes can be counted, or numbers of both the two types of nodes can be counted together, to determine whether a condition agreed by the consensus mechanism to determine the consensus verification result is satisfied. When the number of nodes is determined, the absolute number of nodes can be counted. For example, assuming there are 10 nodes participating in consensus verification, and there are four first nodes and six second nodes. Alternatively, the weighted number of nodes can be counted based on weights of the nodes during consensus verification (a specific weight can be determined based on the consensus mechanism of the blockchain). For example, assuming there are four nodes in total participating in consensus verification, the absolute number of the first nodes and the second nodes are both 2, weights of the two first nodes are respectively 0.5 and 1.2, and weights of the two second nodes are respectively 2 and 4, a calculation expression of the number of first nodes is: 1×0.5+1×1.2=1.7, and a calculation expression of the number of second nodes is: 1×2+1×4=6.

S305: Determine the consensus verification result based on the number of first nodes and/or the number of second nodes.

It can be understood that based on different consensus mechanisms of the blockchain, the consensus verification result can be determined based on the number of first nodes whose verification results are "passing the consensus verification", or can be determined based on the number of second nodes whose verification results are "not passing the consensus verification", or can be determined based on the numbers of both the two types of nodes. It is not limited in the implementations of the present application.

If the consensus verification result is determined based on the number of first nodes, it can be checked whether the number of first nodes satisfies one or more of the following conditions: the number of first nodes reaches a first predetermined threshold; a ratio of the number of first nodes to the number of nodes participating in consensus verification reaches a second predetermined threshold; and a ratio of the number of first nodes to the number of nodes in the blockchain reaches a third predetermined threshold.

It can be understood that based on different consensus mechanisms of the blockchain, different conditions can be predetermined to determine the consensus verification result. All the three example conditions provided above can reflect that the number of first nodes reaching a certain degree indicates that verification results of the to-be-verified digital certificate obtained by enough (specific standards can be different based on different consensus mechanisms) nodes in the blockchain are "passing the consensus verification". Therefore, if the previous conditions are satisfied, the result of the consensus verification can be considered as "passing the consensus verification". This result can be understood as there are enough nodes in the blockchain authorizing the to-be-verified digital certificate that requests to be linked. Therefore, the to-be-verified digital certificate can be further written into the blockchain, so that the authorized digital certificate is stored in the blockchain, and the node corresponding to the digital certificate can perform normal communication in the blockchain.

If the consensus verification result is determined based on the number of second nodes, if verification results of the to-be-verified digital certificate obtained by enough (similarly, specific standards can be different based on different consensus mechanisms) nodes are "not passing the consensus verification", it indicates that enough nodes in the blockchain consider that the to-be-verified digital certificate that requests to be linked is unauthorized. Therefore, the to-be-verified digital certificate cannot be written into the blockchain to become an authorized digital certificate. Correspondingly, the node corresponding to the to-be-verified digital certificate cannot participate in communication of the blockchain network. It can be understood that a specific standard of determining the consensus verification result based on the number of second nodes can be similar to the previous example, and depends on the consensus mechanism of the blockchain. Details are not described here again.

Corresponding to the implementation executed by the blockchain, an implementation of the present application further provides a digital certificate management method, which is performed by a node applying for a digital certificate, and can include:

A node in a blockchain sends a digital certificate linking request to the blockchain, so that the blockchain determines a consensus verification result of a to-be-verified digital certificate of the node, and determines, based on the consensus verification result, whether to write the to-be-verified digital certificate into the blockchain.

The digital certificate linking request includes the to-be-verified digital certificate that is generated by the node through signing by using a private key, and is used to request to write the to-be-verified digital certificate into the blockchain.

All related descriptions in the above-described implementation executed by the blockchain are applicable here, and are not described here again.

Figure 3:
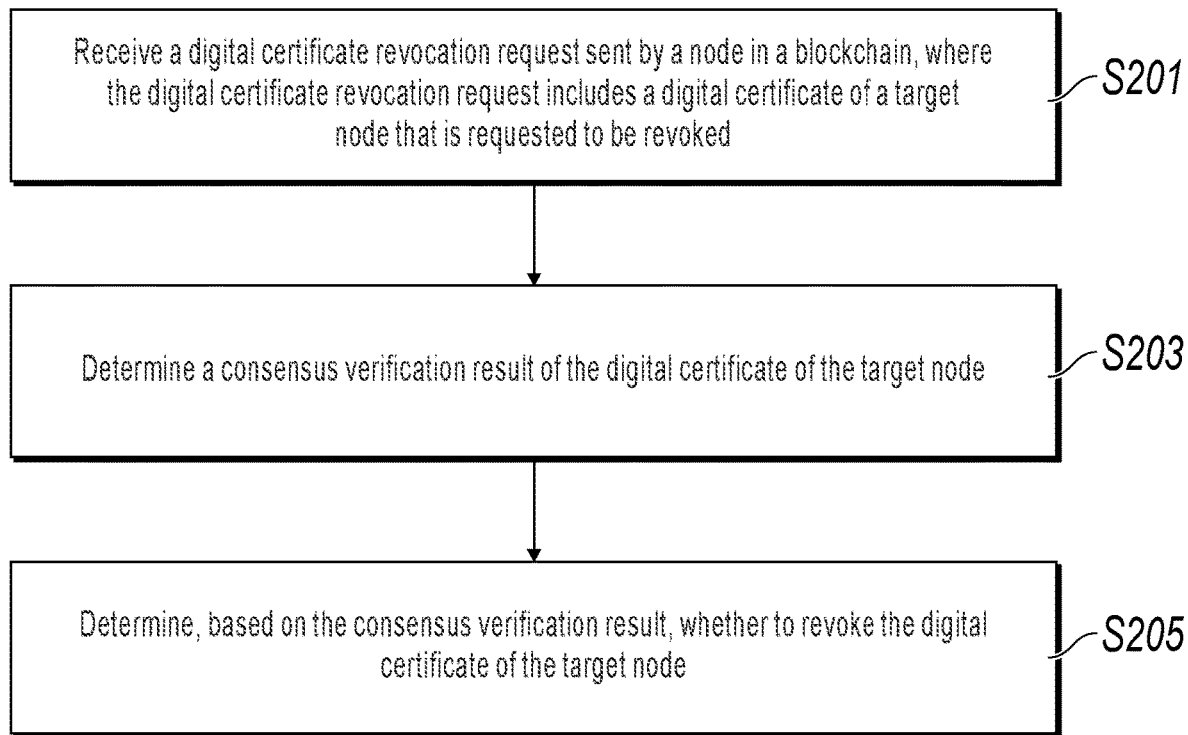
FIG. 3 is a schematic flowchart illustrating a third digital certificate management method, according to an implementation of the present application.

Digital certificate management performed by using the implementations of the present application can include digital certificate revocation in addition to digital certificate issuing, verification, and linking. Referring to FIG. 3, an implementation of the present application further provides a digital certificate management method, to revoke a linked authorized digital certificate by performing the following steps:

S201: Receive a digital certificate revocation request sent by a node in a blockchain, where the digital certificate revocation request includes a digital certificate of a target node that is requested to be revoked.

S203: Determine a consensus verification result of the digital certificate of the target node.

S205: Determine, based on the consensus verification result, whether to revoke the digital certificate of the target node.

Step S203 of determining a consensus verification result of the digital certificate of the target node can include: determining verification results of nodes participating in consensus verification in the blockchain; determining the number of first nodes and/or the number of second nodes in the nodes participating in consensus verification, where a verification result of the first node is passing the consensus verification, and a verification result of the second node is not passing the consensus verification; and determining the consensus verification result based on the number of first nodes and/or the number of second nodes.

Further, the determining the consensus verification result based on the number of first nodes includes: when the number of first nodes satisfies a first predetermined condition, determining that the consensus verification result is passing the consensus verification; and the first predetermined condition includes one or more of the following: the number of first nodes reaches a first predetermined threshold; a ratio of the number of first nodes to the number of nodes participating in consensus verification reaches a second predetermined threshold; and a ratio of the number of first nodes to the number of nodes in the blockchain reaches a third predetermined threshold.

The digital certificate of the target node is revoked in the blockchain when the consensus verification result is passing the consensus verification.

It can be understood that each node in the blockchain can initiate a digital certificate revocation request, can request to revoke a digital certificate of the node, or can request to revoke a digital certificate of another problematic node, which is not limited here. In addition to the digital certificate of the target node that is requested to be revoked, the digital certificate revocation request can include a reason for revoking the digital certificate of the target node, so that each node participating in consensus verification in the blockchain determines whether to pass the consensus verification.

It is worthwhile to note that when consensus verification is performed on the digital certificate revocation request, both the node that initiates the digital certificate revocation request and the target node can participate in consensus verification. However, when consensus verification is performed on a digital certificate linking request, a node that initiates the request cannot participate in consensus verification, because the node has not obtained an authorized digital certificate, and cannot join a blockchain network yet.

It is worthwhile to further note that when consensus verification is performed on the digital certificate revocation request, the verification result of the first nodes being "passing the consensus verification" indicates that the first nodes agree to revoke the digital certificate of the target node, and the verification result of the second nodes being "not passing the consensus verification" indicates that the second nodes disagree to revoke the digital certificate of the target node. Further, in the implementations, the consensus verification result can be determined based on the number of the first nodes and/or the number of the second nodes, to determine whether to revoke the digital certificate of the target node. A process of determining the consensus verification result is similar to consensus verification on a to-be-verified digital certificate. The specific standard is determined by a consensus mechanism, and is not described here.

Corresponding to the implementation executed by the blockchain shown in FIG. 3, an implementation of the present application further provides a digital certificate management method, which is performed by a node applying for a digital certificate, and can include:

A node in a blockchain sends a digital certificate revocation request to the blockchain, so that the blockchain determines a consensus verification result of a digital certificate of a target node, and determines, based on the consensus verification result, whether to revoke the digital certificate of the target node in the blockchain.

The digital certificate revocation request includes the digital certificate of the target node that is requested to be revoked.

All related descriptions in the above-described implementation executed by the blockchain are applicable here, and are not described here again.

Figure 4:
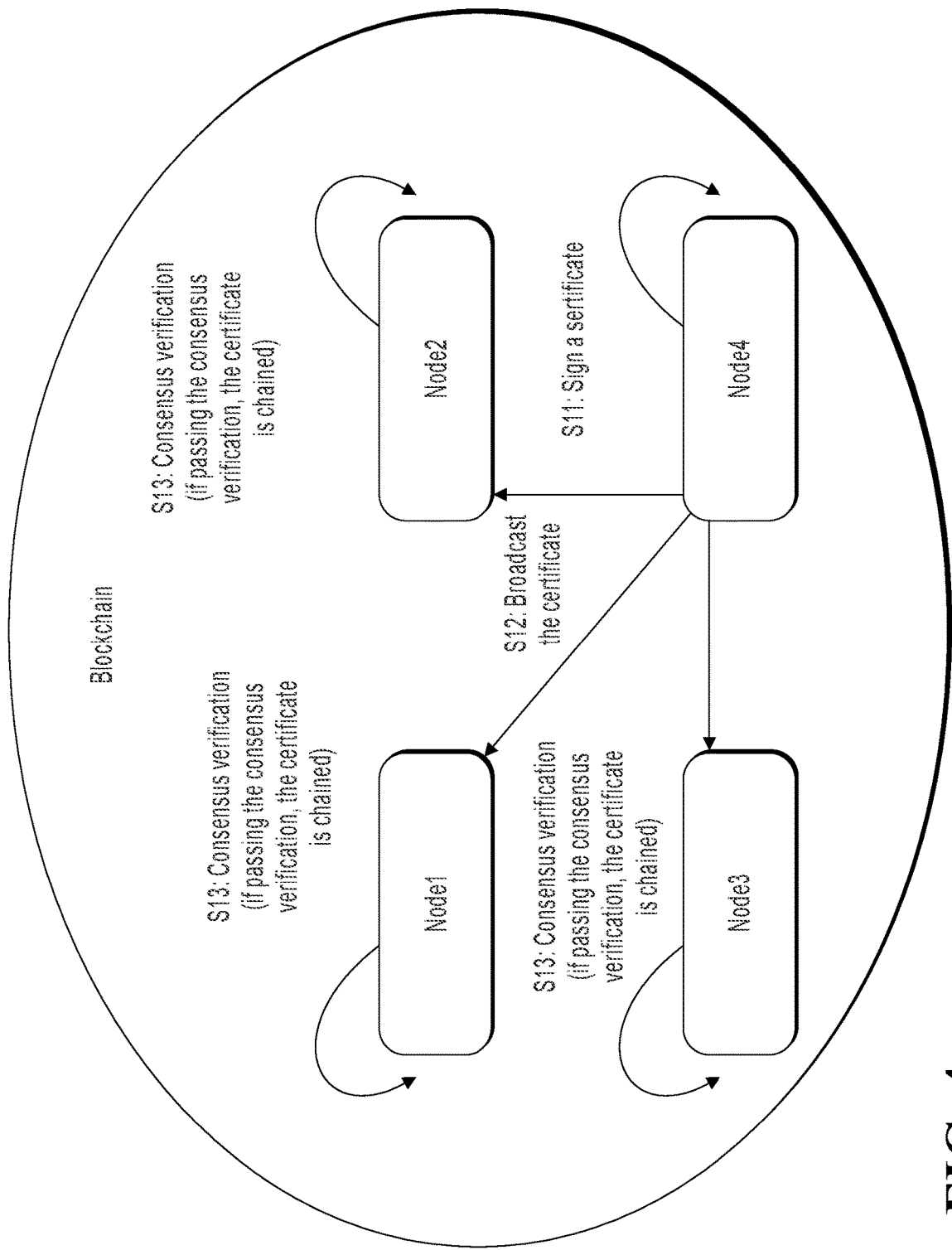
FIG. 4 is a schematic diagram illustrating an implementation scenario, according to an implementation of the present application.

FIG. 4 simply shows an information exchange process of digital certificate management in a blockchain network. For example, a process of digital certificate issuing, verification, and linking includes the following steps:

S11: Node 4 is an initiation node and signs itself by using a disclosed private key, to generate a to-be-verified digital certificate.

S12: Node 4 broadcasts the generated to-be-verified digital certificate to a blockchain.

S13: Node 1, node 2, and node 3 sequentially participate in consensus verification on the to-be-verified digital certificate, and if a consensus verification result is "passing the consensus verification", each node (not limited to nodes 1 to 4) in the blockchain uses the to-be-verified digital certificate of node 4 as an authorized and valid digital certificate for linking. Therefore, node 4 obtains an authorized and valid digital certificate, and can normally participate in communication of a blockchain network.

It can be understood that a digital certificate revocation process is similar to the process of digital certificate issuing, verification, and linking. The main difference is that a request sent by the initiation node changes from a digital certificate linking request to a digital certificate revocation request. Details are not described here again.

In the solution of the implementations of the present application, a function of a conventional Certificate Authority (CA) center is implemented by the blockchain. When a node in the blockchain needs to apply for a digital certificate, the node can sign, by itself using the blockchain internal private key, to generate a to-be-verified digital certificate. The digital certificate can become an authorized and valid digital certificate only after the digital certificate is linked after consensus verification is passed in the blockchain network. The process of digital certificate issuing, verification, and storage is performed in the blockchain. The digital certificate revocation process can also be performed in the blockchain.

In the implementations of the present application, a digital certificate that passes consensus verification can be linked, and only a linked digital certificate is an authorized digital certificate. Therefore, even if a node is attacked by a hacker, or a hacker obtains a CA private key and can randomly issue a digital certificate, the hacker cannot obtain an authorized digital certificate in the blockchain, and therefore cannot join the blockchain network to perform unauthorized communication. Therefore, based on advantages such as decentralization, openness and transparency, and non-tampering, the digital certificate is managed by using the decentralized architecture to improve the security of the blockchain network.

Figure 5:
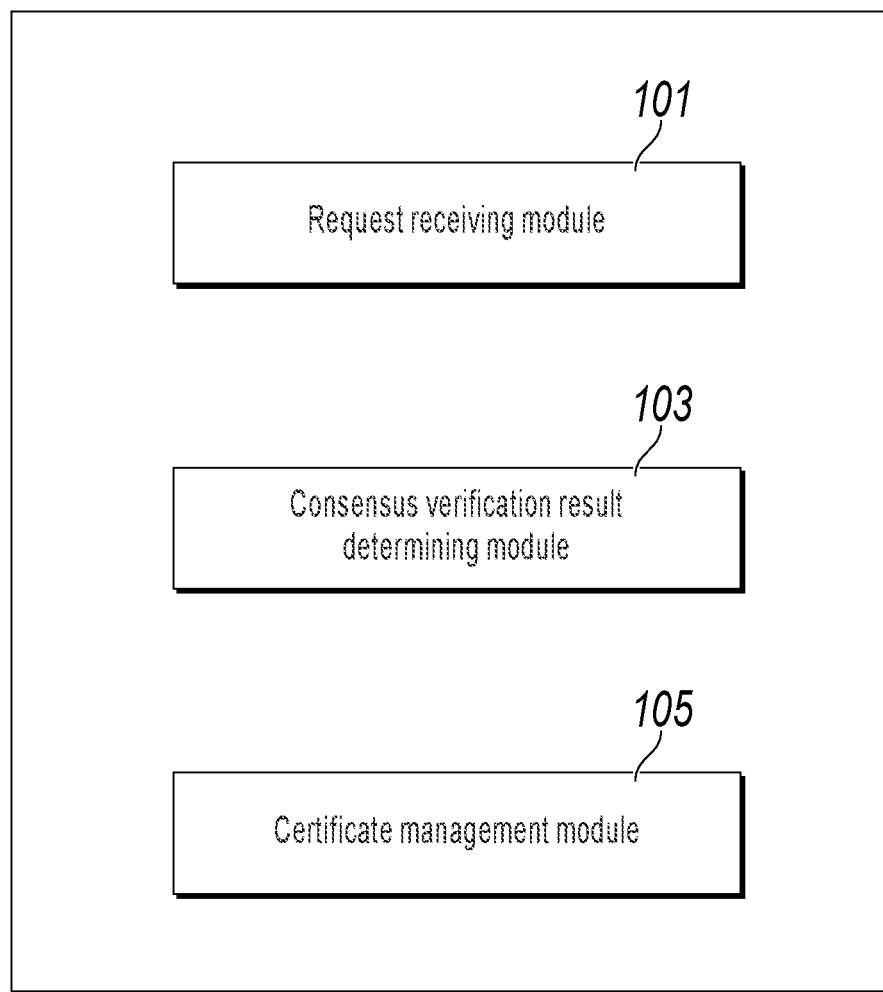
FIG. 5 is a schematic structural diagram illustrating a digital certificate management apparatus, according to an implementation of the present application.

Referring to FIG. 5, an implementation of the present application further provides a digital certificate management apparatus, where the apparatus is applied to a blockchain and includes: a request receiving module 101, configured to receive a digital certificate linking request sent by a node in the blockchain, where the digital certificate linking request includes a to-be-verified digital certificate that is generated by the node through signing by using a private key, and is used to request to write the to-be-verified digital certificate into the blockchain; a consensus verification result determining module 103, configured to determine a consensus verification result of the to-be-verified digital certificate of the node; and a certificate management module 105, configured to determine, based on the consensus verification result, whether to write the to-be-verified digital certificate into the blockchain.

Figure 6:
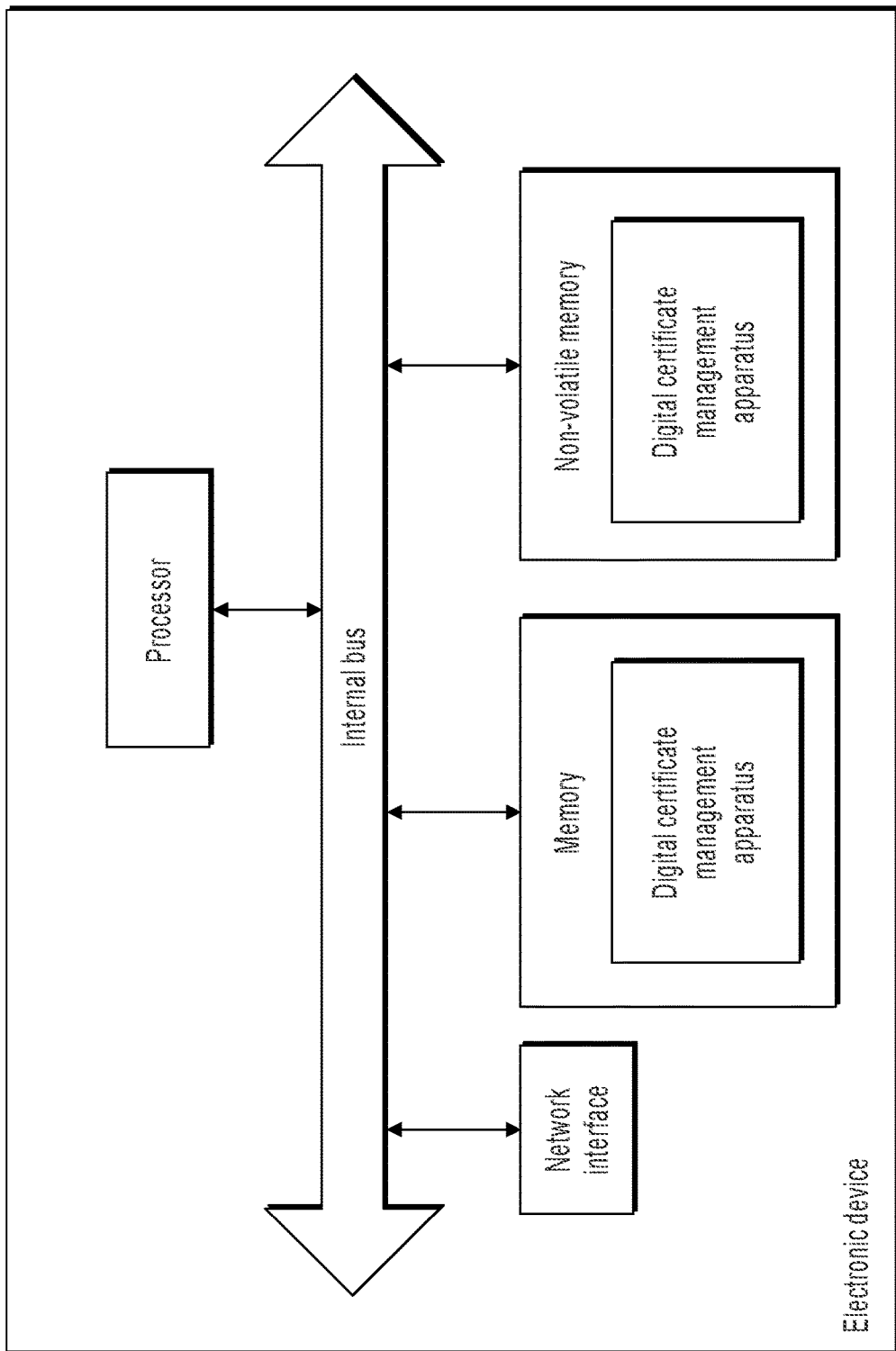
FIG. 6 is a schematic structural diagram illustrating an electronic device, according to an implementation of the present application.

FIG. 6 is a schematic structural diagram illustrating an electronic device, according to an implementation of the present application. Referring to FIG. 6, in terms of hardware, the electronic device includes a processor, and optionally further includes an internal bus, a network interface, and a storage. The storage can include a memory, for example, a high-speed random access memory (RAM), and can further include a nonvolatile memory (nonvolatile memory), for example, at least one magnetic disk storage. Certainly, the electronic device can further include hardware needed by another service.

The processor, the network interface, and the storage can be connected to each other by using the internal bus. The internal bus can be an industry standard architecture (ISA) bus, a Peripheral Component Interconnect (PCI) bus, an extended industry standard architecture (EISA) bus, etc. The bus can be classified into an address bus, a data bus, a control bus, etc. For ease of indication, the bus is indicated by using only one double-headed arrow in FIG. 6. However, it does not mean that there is only one bus or only one type of bus.

The storage is configured to store a program. The program can include program code, and the program code includes computer operation instructions. The storage can include a memory and a nonvolatile memory, and provide an instruction and data for the processor.

The processor reads a corresponding computer program from the nonvolatile memory to the memory for running, and a digital certificate management apparatus is logically formed. The processor executes the program stored in the storage, and is configured to perform the following operations: receiving a digital certificate linking request sent by a node in a blockchain, where the digital certificate linking request includes a to-be-verified digital certificate that is generated by the node through signing by using a private key, and is used to request to write the to-be-verified digital certificate into the blockchain; determining a consensus verification result of the to-be-verified digital certificate of the node; and determining, based on the consensus verification result, whether to write the to-be-verified digital certificate into the blockchain.

The above-described method executed by the digital certificate management apparatus and disclosed in the implementation shown in FIG. 1 of the present application can be applied to the processor, or can be implemented by the processor. The processor can be an integrated circuit chip and have a signal processing capability. In an implementation process, steps in the above-described method can be implemented by using a hardware integrated logical circuit in the processor, or by using instructions in a form of software. The processor can be a general purpose processor, including a central processing unit (CPU), a network processor (NP), etc.; or can be a digital signal processor (DSP), an application-specific integrated circuit (ASIC), a field programmable gate array (FPGA) or other programmable logical devices, a discrete gate or transistor logic device, a discrete hardware component, etc. The processor can implement or perform the methods, the steps, and the logical block diagrams disclosed in the implementations of the present application. The general purpose processor can be a microprocessor, or the processor can be any conventional processor, etc. The steps of the methods disclosed in the implementations of the present application can be directly performed by a hardware decoding processor, or performed by a combination of hardware and software modules in a decoding processor. The software module can be located in a mature storage medium in the field, such as a random access memory, a flash memory, a read-only memory, a programmable read-only memory, an electrically erasable programmable memory, or a register. The storage medium is located in the storage, and the processor reads information in the storage and completes the steps in the previous method in combination with hardware in the processor.

The electronic device can further perform the method of FIG. 1 performed by the digital certificate management apparatus, and implement functions of the digital certificate management apparatus in the implementation shown in FIG. 3. Details are not described in the implementations of the present application.

An implementation of the present application further provides a computer-readable storage medium, the computer-readable storage medium stores one or more programs, and the one or more programs include an instruction. When the instruction is executed by an electronic device including a plurality of application programs, the electronic device can execute the method in the implementation shown in FIG. 1 executed by a digital certificate management apparatus, and is configured to perform the following operations: receiving a digital certificate linking request sent by a node in a blockchain, where the digital certificate linking request includes a to-be-verified digital certificate that is generated by the node through signing by using a private key, and is used to request to write the to-be-verified digital certificate into the blockchain; determining a consensus verification result of the to-be-verified digital certificate of the node; and determining, based on the consensus verification result, whether to write the to-be-verified digital certificate into the blockchain.

Figure 7:
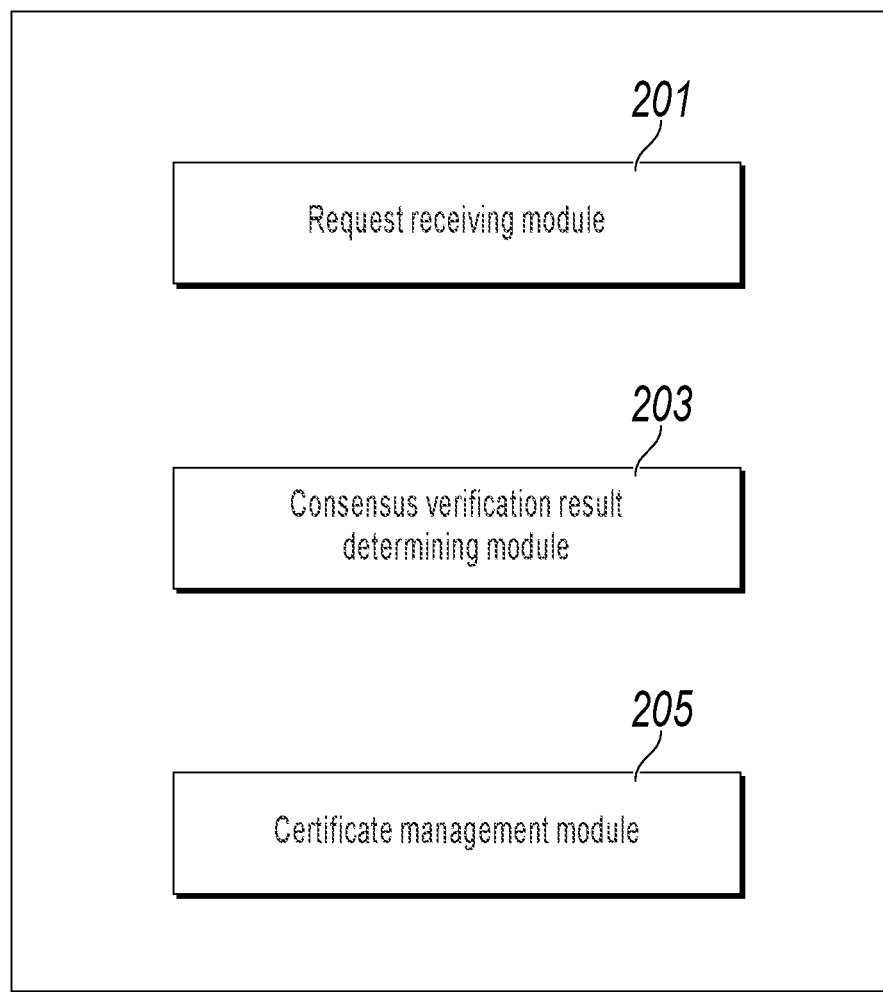
FIG. 7 is a schematic structural diagram illustrating a second digital certificate management apparatus, according to an implementation of the present application.

Referring to FIG. 7, an implementation of the present application further provides a digital certificate management apparatus, where the apparatus is applied to a blockchain and includes: a request receiving module 201, configured to receive a digital certificate revocation request sent by a node in the blockchain, where the digital certificate revocation request includes a digital certificate of a target node that is requested to be revoked; a consensus verification result determining module 203, configured to determine a consensus verification result of the digital certificate of the target node; and a certificate management module 205, configured to determine, based on the consensus verification result, whether to revoke the digital certificate of the target node in the blockchain.

Figure 8:
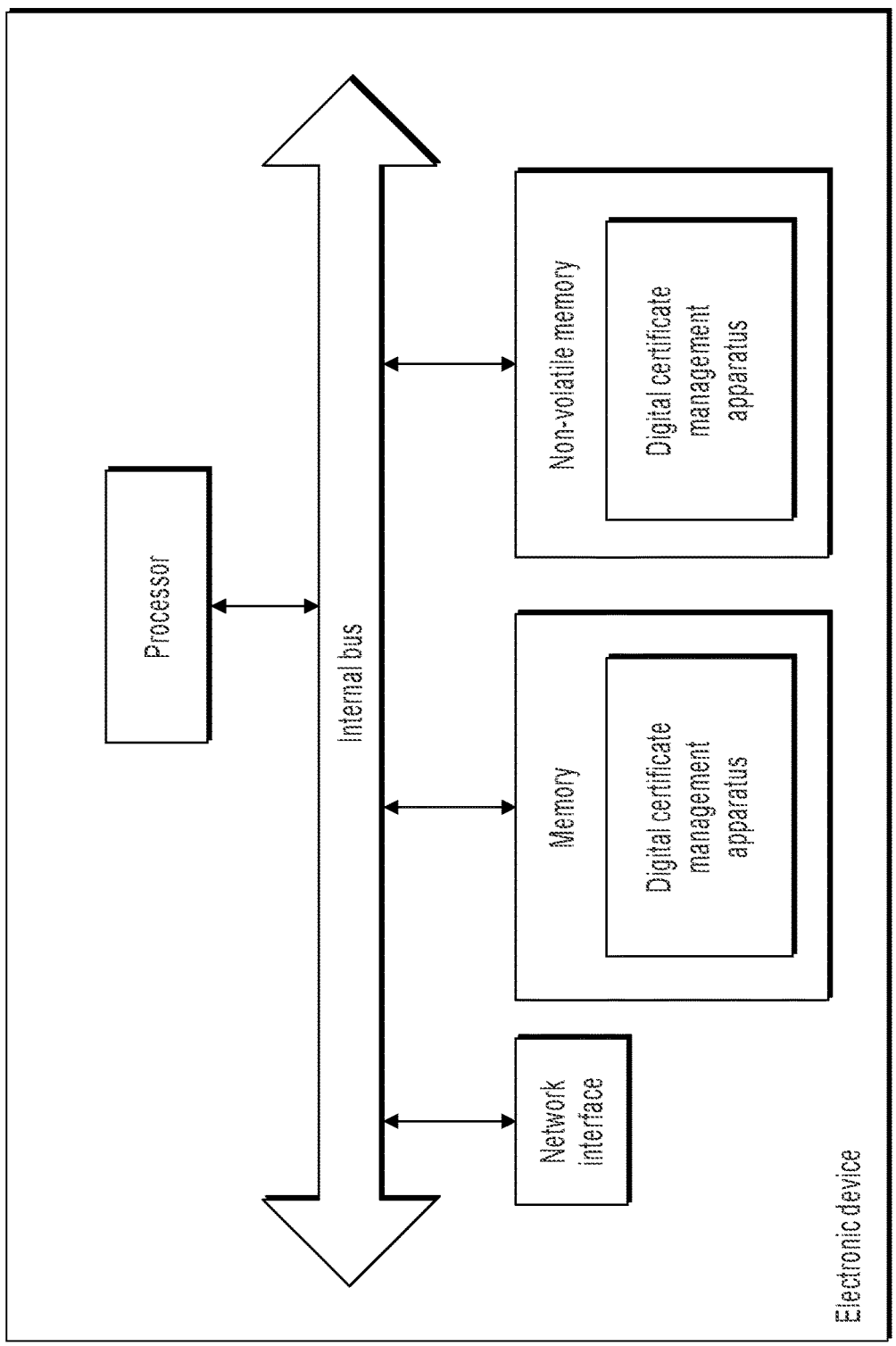
FIG. 8 is a schematic structural diagram illustrating a second electronic device, according to an implementation of the present application.

FIG. 8 is a schematic structural diagram illustrating an electronic device, according to an implementation of the present application. Referring to FIG. 8, in terms of hardware, the electronic device includes a processor, and optionally further includes an internal bus, a network interface, and a storage. The storage can include a memory, for example, a high-speed random access memory (RAM), and can further include a nonvolatile memory (nonvolatile memory), for example, at least one magnetic disk storage. Certainly, the electronic device can further include hardware needed by another service.

The processor, the network interface, and the storage can be connected to each other by using the internal bus. The internal bus can be an industry standard architecture (ISA) bus, a Peripheral Component Interconnect (PCI) bus, an extended industry standard architecture (EISA) bus, etc. The bus can be classified into an address bus, a data bus, a control bus, etc. For ease of indication, the bus is indicated by using only one double-headed arrow in FIG. 8. However, it does not mean that there is only one bus or only one type of bus.

The storage is configured to store a program. The program can include program code, and the program code includes computer operation instructions. The storage can include a memory and a nonvolatile memory, and provide an instruction and data for the processor.

The processor reads a corresponding computer program from the nonvolatile memory to the memory for running, and a digital certificate management apparatus is logically formed. The processor executes the program stored in the storage, and is configured to perform the following operations: receiving a digital certificate revocation request sent by a node in a blockchain, where the digital certificate revocation request includes a digital certificate of a target node that is requested to be revoked; determining a consensus verification result of the digital certificate of the target node; and determining, based on the consensus verification result, whether to revoke the digital certificate of the target node in the blockchain.

The previous method executed by the digital certificate management apparatus that is disclosed in the implementation shown in FIG. 3 of the present application can be applied to the processor, or can be implemented by the processor. The processor can be an integrated circuit chip and have a signal processing capability. In an implementation process, steps in the previous method can be implemented by using a hardware integrated logical circuit in the processor, or by using instructions in a form of software. The processor can be a general purpose processor, including a central processing unit (CPU), a network processor (NP), etc.; or can be a digital signal processor (DSP), an application-specific integrated circuit (ASIC), a field programmable gate array (FPGA) or another programmable logical device, a discrete gate or transistor logic device, a discrete hardware component, etc. The processor can implement or perform the methods, the steps, and the logical block diagrams disclosed in the implementations of the present application. The general purpose processor can be a microprocessor, or the processor can be any conventional processor, etc. The steps of the methods disclosed in the implementations of the present application can be directly performed by a hardware decoding processor, or performed by a combination of hardware and software modules in a decoding processor. The software module can be located in a mature storage medium in the field, such as a random access memory, a flash memory, a read-only memory, a programmable read-only memory, an electrically erasable programmable memory, or a register. The storage medium is located in the storage, and the processor reads information in the storage and completes the steps in the previous method in combination with hardware in the processor.

The electronic device can further perform the method performed by the digital certificate management apparatus in FIG. 3, and implement functions of the digital certificate management apparatus in the implementation shown in FIG. 3. Details are not described in the implementations of the present application.

An implementation of the present application further provides a computer-readable storage medium, the computer-readable storage medium stores one or more programs, and the one or more programs include an instruction. When the instruction is executed by an electronic device including a plurality of application programs, the electronic device can execute the method executed by a digital certificate management apparatus in the implementation shown in FIG. 1, and is configured to perform the following operations: receiving a digital certificate revocation request sent by a node in a blockchain, where the digital certificate revocation request includes a digital certificate of a target node that is requested to be revoked; determining a consensus verification result of the digital certificate of the target node; and determining, based on the consensus verification result, whether to revoke the digital certificate of the target node in the blockchain.

Figure 9:
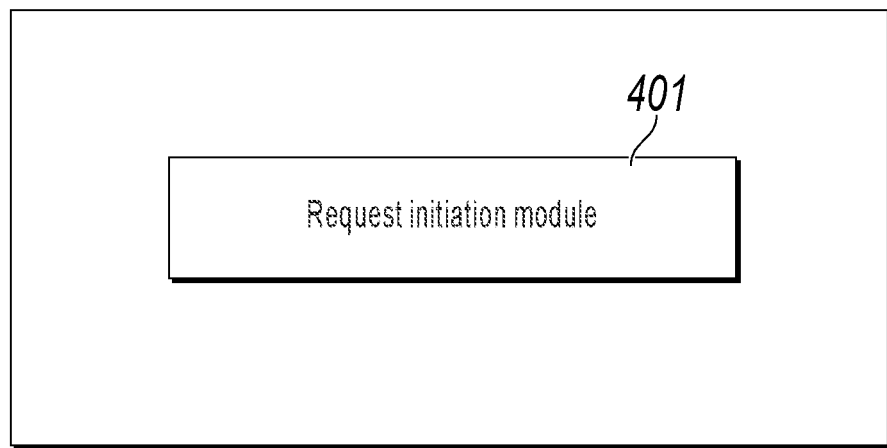
FIG. 9 is a schematic structural diagram illustrating a third digital certificate management apparatus, according to an implementation of the present application.

Referring to FIG. 9, an implementation of the present application provides a digital certificate management apparatus, where the apparatus is applied to a node in a blockchain and includes: a request initiation module 401, configured to send a digital certificate linking request to the blockchain, so that the blockchain determines a consensus verification result of a to-be-verified digital certificate of the node, and determines, based on the consensus verification result, whether to write the to-be-verified digital certificate into the blockchain, where the digital certificate linking request includes the to-be-verified digital certificate that is generated by the node through signing by using a private key, and is used to request to write the to-be-verified digital certificate into the blockchain.

Figure 10:
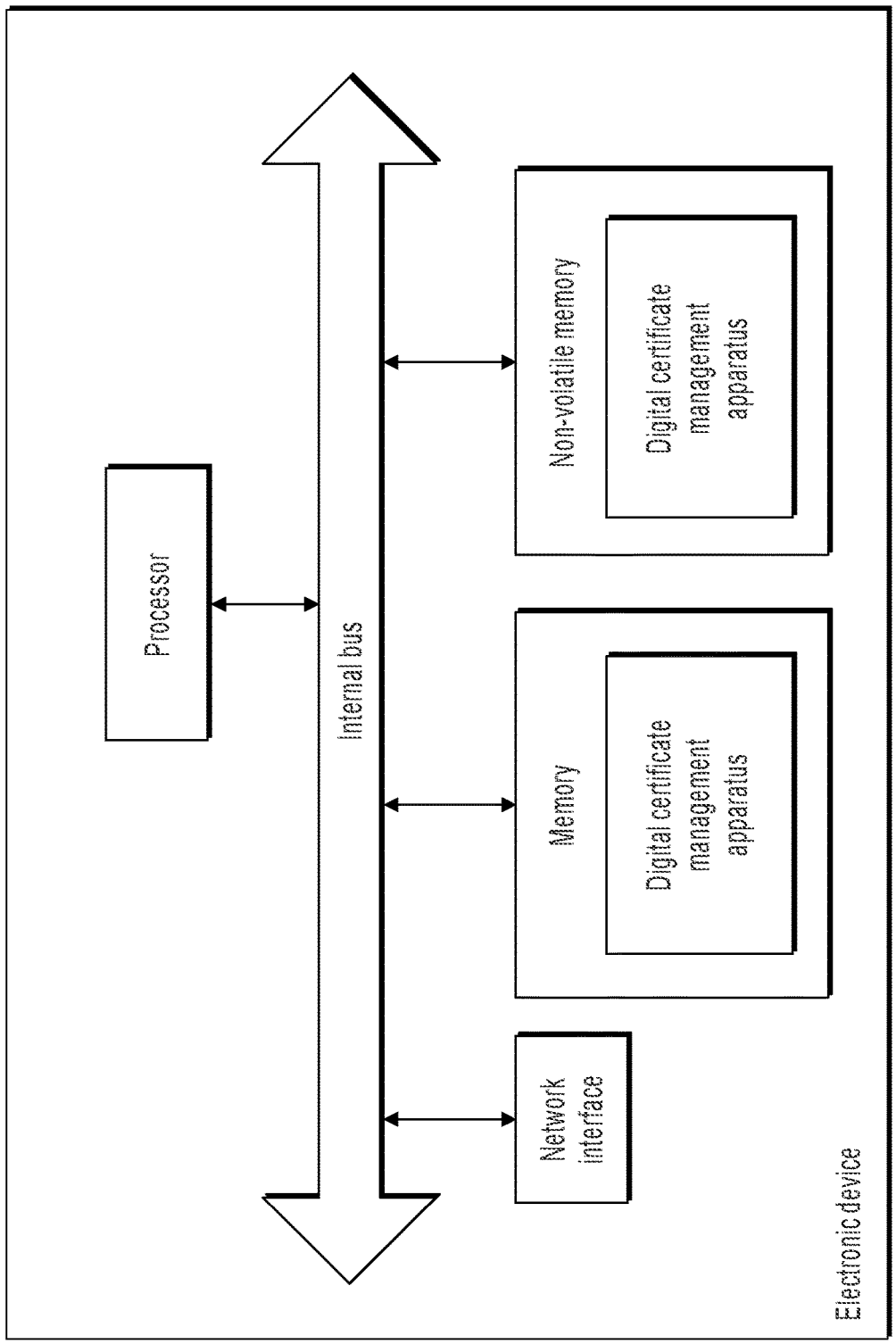
FIG. 10 is a schematic structural diagram illustrating a third electronic device, according to an implementation of the present application.

FIG. 10 is a schematic structural diagram illustrating an electronic device, according to an implementation of the present application. Referring to FIG. 10, in terms of hardware, the electronic device includes a processor, and optionally further includes an internal bus, a network interface, and a storage. The storage can include a memory, for example, a high-speed random access memory (RAM), and can further include a nonvolatile memory (nonvolatile memory), for example, at least one magnetic disk storage. Certainly, the electronic device can further include hardware needed by another service.

The processor, the network interface, and the storage can be connected to each other by using the internal bus. The internal bus can be an industry standard architecture (ISA) bus, a Peripheral Component Interconnect (PCI) bus, an extended industry standard architecture (EISA) bus, etc. The bus can be classified into an address bus, a data bus, a control bus, etc. For ease of indication, the bus is indicated by using only one double-headed arrow in FIG. 10. However, it does not mean that there is only one bus or only one type of bus.

The storage is configured to store a program. The program can include program code, and the program code includes computer operation instructions. The storage can include a memory and a nonvolatile memory, and provide an instruction and data for the processor.

The processor reads a corresponding computer program from the nonvolatile memory to the memory for running, and a digital certificate management apparatus is logically formed. The processor executes the program stored in the storage, and is configured to perform the following operation: sending a digital certificate linking request to a blockchain, so that the blockchain determines a consensus verification result of a to-be-verified digital certificate of a node, and determines, based on the consensus verification result, whether to write the to-be-verified digital certificate into the blockchain, where the digital certificate linking request includes the to-be-verified digital certificate that is generated by the node through signing by using a private key, and is used to request to write the to-be-verified digital certificate into the blockchain.

The previous methods executed by the digital certificate management apparatus that are disclosed in the previous implementations of the present application can be applied to the processor, or can be implemented by the processor. The processor can be an integrated circuit chip and have a signal processing capability. In an implementation process, steps in the previous methods can be implemented by using a hardware integrated logical circuit in the processor, or by using instructions in a form of software. The processor can be a general purpose processor, including a central processing unit (CPU), a network processor (NP), etc.; or can be a digital signal processor (DSP), an application-specific integrated circuit (ASIC), a field programmable gate array (FPGA) or another programmable logical device, a discrete gate or transistor logic device, a discrete hardware component, etc. The processor can implement or perform the methods, the steps, and the logical block diagrams disclosed in the implementations of the present application. The general purpose processor can be a microprocessor, or the processor can be any conventional processor, etc. The steps of the methods disclosed in the implementations of the present application can be directly performed by a hardware decoding processor, or performed by a combination of hardware and software modules in a decoding processor. The software module can be located in a mature storage medium in the field, such as a random access memory, a flash memory, a read-only memory, a programmable read-only memory, an electrically erasable programmable memory, or a register. The storage medium is located in the storage, and the processor reads information in the storage and completes the steps in the previous methods in combination with hardware in the processor.

The electronic device can further perform the method performed by the digital certificate management apparatus, and implement functions of the digital certificate management apparatus in the previous implementations. Details are not described in the implementations of the present application.

An implementation of the present application further provides a computer-readable storage medium, the computer-readable storage medium stores one or more programs, and the one or more programs include an instruction. When the instruction is executed by an electronic device including a plurality of application programs, the electronic device can execute the methods executed by a digital certificate management apparatus in the previous implementations, and is configured to perform the following operation: sending a digital certificate linking request to a blockchain, so that the blockchain determines a consensus verification result of a to-be-verified digital certificate of a node, and determines, based on the consensus verification result, whether to write the to-be-verified digital certificate into the blockchain, where the digital certificate linking request includes the to-be-verified digital certificate that is generated by the node through signing by using a private key, and is used to request to write the to-be-verified digital certificate into the blockchain.

Figure 11:
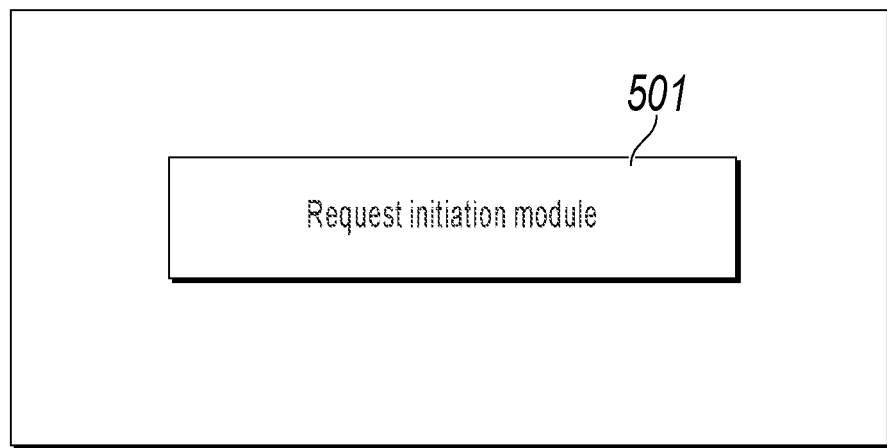
FIG. 11 is a schematic structural diagram illustrating a fourth digital certificate management apparatus, according to an implementation of the present application.

Referring to FIG. 11, an implementation of the present application further provides a digital certificate management apparatus, where the apparatus is applied to a node in a blockchain and includes: a request initiation module 501, configured to send a digital certificate revocation request to the blockchain, so that the blockchain determines a consensus verification result of a digital certificate of a target node, and determines, based on the consensus verification result, whether to revoke the digital certificate of the target node in the blockchain, where the digital certificate revocation request includes the digital certificate of the target node that is requested to be revoked.

Figure 12:
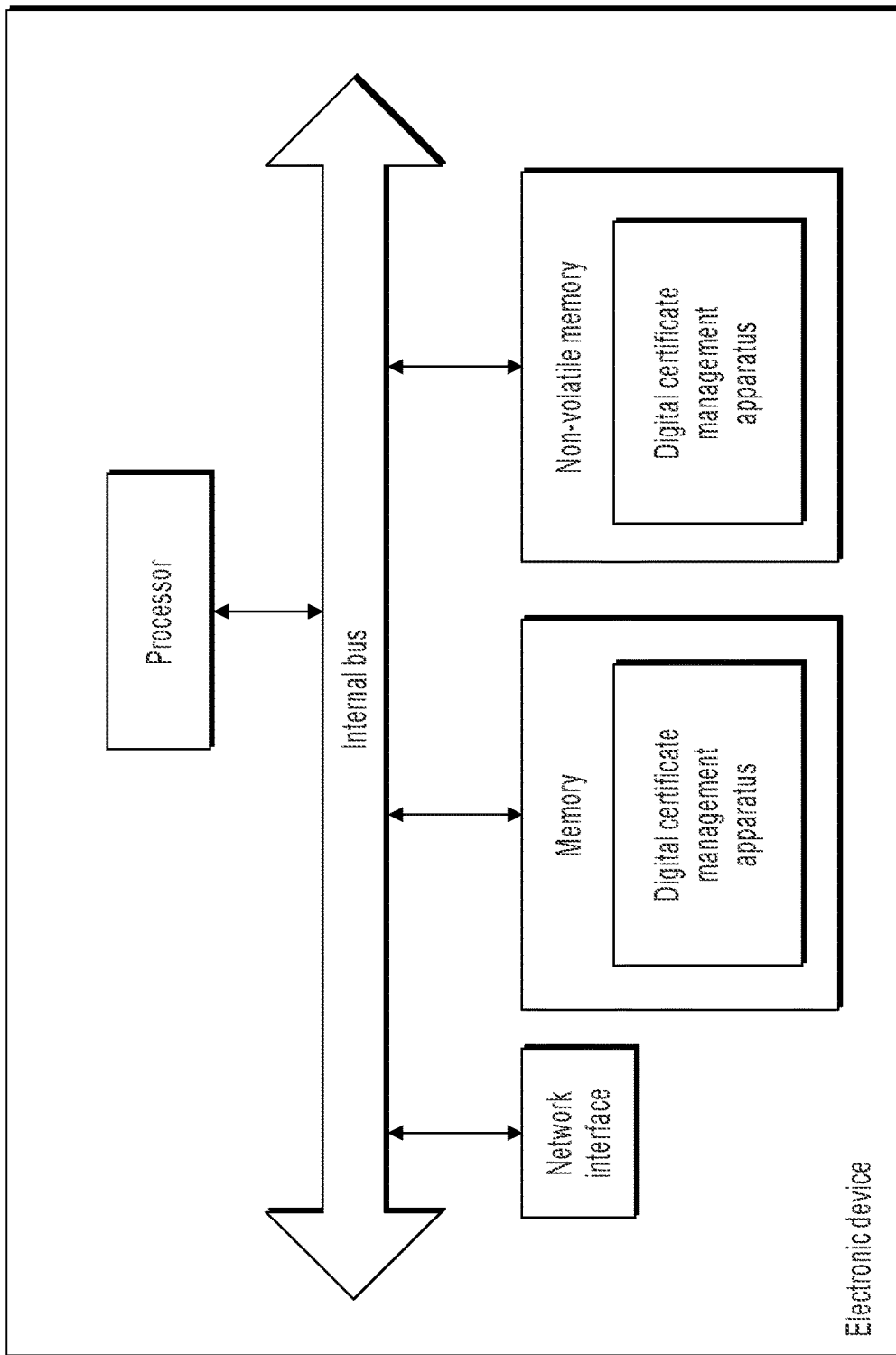
FIG. 12 is a schematic structural diagram illustrating a fourth electronic device, according to an implementation of the present application.

FIG. 12 is a schematic structural diagram illustrating an electronic device, according to an implementation of the present application. Referring to FIG. 12, in terms of hardware, the electronic device includes a processor, and optionally further includes an internal bus, a network interface, and a storage. The storage can include a memory, for example, a high-speed random access memory (RAM), and can further include a nonvolatile memory, for example, at least one magnetic disk storage. Certainly, the electronic device can further include hardware needed by another service.

The processor, the network interface, and the storage can be connected to each other by using the internal bus. The internal bus can be an industry standard architecture (ISA) bus, a Peripheral Component Interconnect (PCI) bus, an extended industry standard architecture (EISA) bus, etc. The bus can be classified into an address bus, a data bus, a control bus, etc. For ease of indication, the bus is indicated by using only one double-headed arrow in FIG. 12. However, it does not mean that there is only one bus or only one type of bus.

The storage is configured to store a program. The program can include program code, and the program code includes computer operation instructions. The storage can include a memory and a nonvolatile memory, and provide an instruction and data for the processor.

The processor reads a corresponding computer program from the nonvolatile memory to the memory for running, and a digital certificate management apparatus is logically formed. The processor executes the program stored in the storage, and is configured to perform the following operation: sending a digital certificate revocation request to a blockchain, so that the blockchain determines a consensus verification result of a digital certificate of a target node, and determines, based on the consensus verification result, whether to revoke the digital certificate of the target node in the blockchain, where the digital certificate revocation request includes the digital certificate of the target node that is requested to be revoked.

The previous methods executed by the digital certificate management apparatus that are disclosed in the previous implementations of the present application can be applied to the processor, or can be implemented by the processor. The processor can be an integrated circuit chip and have a signal processing capability. In an implementation process, steps in the previous methods can be implemented by using a hardware integrated logical circuit in the processor, or by using instructions in a form of software. The processor can be a general purpose processor, including a central processing unit (CPU), a network processor (NP), etc.; or can be a digital signal processor (DSP), an application-specific integrated circuit (ASIC), a field programmable gate array (FPGA) or another programmable logical device, a discrete gate or transistor logic device, a discrete hardware component, etc. The processor can implement or perform the methods, the steps, and the logical block diagrams disclosed in the implementations of the present application. The general purpose processor can be a microprocessor, or the processor can be any conventional processor, etc. The steps of the methods disclosed in the implementations of the present application can be directly performed by a hardware decoding processor, or performed by a combination of hardware and software modules in a decoding processor. The software module can be located in a mature storage medium in the field, such as a random access memory, a flash memory, a read-only memory, a programmable read-only memory, an electrically erasable programmable memory, or a register. The storage medium is located in the storage, and the processor reads information in the storage and completes the steps in the previous methods in combination with hardware in the processor.

The electronic device can further perform the method performed by the digital certificate management apparatus, and implement functions of the digital certificate management apparatus in the previous implementations. Details are not described in the implementations of the present application.

An implementation of the present application further provides a computer-readable storage medium, the computer-readable storage medium stores one or more programs, and the one or more programs include an instruction. When the instruction is executed by an electronic device including a plurality of application programs, the electronic device can execute the methods executed by a digital certificate management apparatus in the previous implementations, and is configured to perform the following operation: sending a digital certificate revocation request to a blockchain, so that the blockchain determines a consensus verification result of a digital certificate of a target node, and determines, based on the consensus verification result, whether to revoke the digital certificate of the target node in the blockchain, where the digital certificate revocation request includes the digital certificate of the target node that is requested to be revoked.

A person skilled in the art should understand that the implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a magnetic disk storage, a CD-ROM, an optical memory, etc.) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific method, so that the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In typical configuration, a computing device includes one or more processors (CPU), an input/output interface, a network interface, and a memory.

The memory can include a non-persistent storage, a random access memory (RAM), a nonvolatile memory, and/or another form that are in a computer-readable medium, for example, a read-only memory (ROM) or a flash memory (flash memory). The memory is an example of the computer-readable medium.

The computer-readable medium includes persistent, non-persistent, movable, and unmovable media that can implement information storage by using any method or technology. Information can be a computer-readable instruction, a data structure, a program module, or other data. An example of a computer storage medium includes but is not limited to a parameter random access memory (PRAM), a static random access memory (SRAM), a dynamic random access memory (DRAM), another type of random access memory (RAM), a read-only memory (ROM), an electrically erasable programmable read only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that can be configured to store information that can be accessed by the computing device. Based on the definition in the present specification, the computer-readable medium does not include a transitory computer-readable media (transitory computer-readable media), for example, a modulated data signal and carrier.

It is worthwhile to further note that in the present specification, the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a magnetic disk storage, a CD-ROM, an optical memory, etc.) that include computer-usable program code.

The previous descriptions are merely implementations of the present application, and are not intended to limit the present application. For a person skilled in the art, the present application can have various modifications and changes. Any modification, equivalent replacement, or improvement made without departing from the spirit and principle of the present application shall fall within the scope of the claims of the present application.

Figure 13:
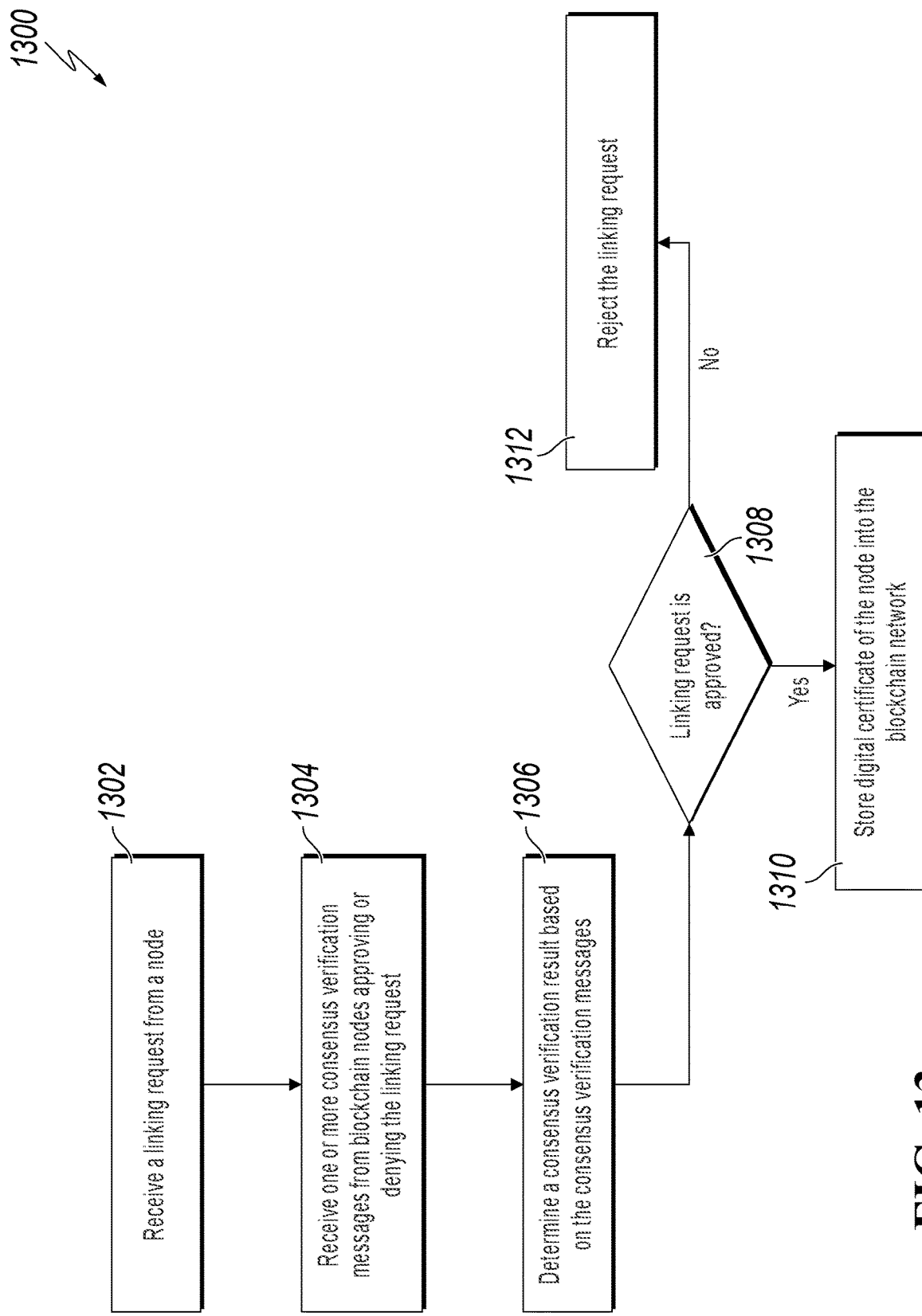
FIG. 13 is a flowchart illustrating an example of a computer-implemented method for validating digital certificate of a node, according to an implementation of the present disclosure.

FIG. 13 is a flowchart illustrating an example of a computer-implemented method 1300 for validating digital certificate of a node, according to an implementation of the present disclosure. For clarity of presentation, the description that follows generally describes method 1300 in the context of the other figures in this description. For example, the method 1300 can be implemented by a blockchain node described with reference to FIG. 4, the digital certificate management apparatus of FIG. 5, or any other computing device in communication with blockchain nodes. However, it will be understood that method 1300 can be performed, for example, by any system, environment, software, and hardware, or a combination of systems, environments, software, and hardware, as appropriate. In some implementations, various steps of method 1300 can be run in parallel, in combination, in loops, or in any order.

At 1302, a linking request is received from a node. The linking request includes a request to link the node to a blockchain network. Node 4 in FIG. 4 is an example of a node sending the linking request. The node can include a digital code into the linking request. In case the linking request is approved, a digital certificate is assigned to the node based on the digital code. The digital code can be in a form of a digital certificate that is yet to be approved. The node may provide the digital certificate based on a private key associated with the node. The node sends the request to the blockchain network. For example, the node may send the request a set of blockchain nodes (for example, nodes 1-3 in FIG. 4), or to a digital certificate management device (for example, a CA) that forwards the linking request to a set of blockchain nodes for consensus verification. From 1302, method 1300 proceeds to 1304.

At 1304, one or more consensus verification messages are received from blockchain nodes approving or denying the links. For example, each node in the set of blockchain nodes that received the linking request may send out an approval or denial of the request in form of a consensus verification message. Nodes of the set of blockchain nodes send the consensus verification message to each other, a digital certificate management device of the blockchain, or a combination of the nodes of the set of blockchain nodes and the digital certificate management device of the blockchain. In some implementations, number of nodes in the set of blockchain nodes need to be greater than a threshold number. In some examples, the threshold number is determined based on a total number of all nodes in the blockchain. For example, the threshold may be 60% (or 30%) of the total number of nodes. From 1304, method 1300 proceeds to 1306.

At 1306, a consensus verification result is determined based on the consensus verification messages received from the set of blockchain nodes. The consensus verification result can be determined based on the number of nodes in the set of blockchain nodes. For example, the consensus verification result can be determined based on a majority, or a ratio of approval and denial consensus verification messages received from the set of blockchain nodes. In some implementations, one or more blockchain nodes are associated with a weight, and the consensus verification result is determined based on the weight of the respective nodes. For example, between two nodes with different weights, the node with a greater weight can influence the consensus verification result more than the other node. The consensus verification result indicates whether the set of blockchain nodes have approved or denied the linking request. From 1306, method 1300 proceeds to 1308.

At 1308, a determination is made as to whether the linking request is approved. The determination is made based on the consensus verification result. In some examples, the linking request is determined to be approved based on determining that number of blockchain nodes that approve the linking request is higher than a threshold number. In some examples, the linking request is determined to be approved based on determining that a ratio of the number of blockchain nodes that approve the linking request to the number of blockchain nodes that provided the consensus verification message is higher than a threshold number. In some examples, the linking request is determined to be approved based on determining that ratio of number of blockchain nodes that approve the linking request to number of all blockchain nodes in the blockchain network is higher than a threshold number. If it is determined that the linking request is approved, method 1300 proceeds to 1310. Otherwise, if it is determined that the linking request is not approved (or denied), method 1300 proceeds to 1312.

At 1310, a digital certificate associated with the node (which is the requesting node) is stored in the blockchain. Once the blockchain approves the linking request, the node is added (or linked) to the blockchain and a digital certificate associated with the node is stored into the blockchain. The digital certificate can be provided based on the digital code included in the linking request. The digital certificate can be stored into the blockchain nodes (for example, multiple nodes of the blockchain), into a digital certificate management device (for example, a CA) associated with the blockchain, or both.

At 1312, the linking request is rejected. Upon rejecting the linking request, no digital certificate is assigned to the node and the node is not added to the blockchain. In some implementations, a history of the rejected linking requests or digital codes included in the rejected linking are stored in the blockchain (for example, in multiple blockchain nodes).

Method 1300 provides an example method for validating digital certificates blockchain nodes. In some implementations, digital certificates can be revoked by blockchain nodes. For example, a node of the blockchain may request revocation of a digital certificate that is already valid in the blockchain. The node can send a revocation request for revoking its own digital certificate, or another node's digital certificate. The revocation request can include a digital certificate or another identifier of a targeted node that is requested to be revoked. The revocation request can also include a reason for the request, for example, an indication that the targeted node conducted insecure transactions within the blockchain.

Similar to the validation process, the revocation process is performed based on a consensus verification received from a set of blockchain nodes. Accordingly, one or more revocation consensus messages are received from one or more blockchain nodes; each of the revocation consensus messages indicating whether the respective blockchain node approves or denies the revocation request. Based on the received revocation consensus messages, a revocation consensus result is determined. The revocation consensus result indicates whether the revocation request has been approved or denied by the one or more blockchain nodes. Upon determining that the revocation consensus result has been approved, the digital certificate of the targeted node is revoked from digital certificates stored in the blockchain network. A node whose digital certificate is revoked loses connection to the blockchain. If the node wants to reconnect (or link) to the blockchain, the node has to send a linking request to the blockchain. In some implementations, a list of the revoked digital certificates is stored in the blockchain. For example, multiple nodes (for example, the one or more nodes that have approved the revocation) may store the revoked digital certificate or another identifier of the targeted node into a revocation list.

To ensure security in blockchain communications, each blockchain node is assigned with a digital certificate. Only the nodes that have a valid digital certificate are authorized to communicate in the blockchain. Conventionally, the digital certificates are assigned to the nodes by a CA. The CA provides the digital certificates based on a private key associated with the blockchain. The CA stores information of the issued, revoked, and valid digital certificates. When nodes in the blockchain need to communicate with each other, validity of the digital certificates of the respective nodes are checked by querying the digital certificates in the CA.

The conventional dependency on CA for issuance, revocation, and validity check of the digital certificates puts the blockchain communications at risk and exposed to hackers' manipulations. Once the CA is hacked, a hacker can tamper with the digital certificate validities stored in the CA. For example, the hacker can revoke digital certificates of one or more authorized nodes, or validate digital certificates for one or more previously revoked nodes. In addition, the hacker can add unauthorized nodes to the blockchain by including fake digital certificates into the CA.

Implementations of the present disclosure provide techniques to improve security of blockchain. According to the implementations, validation, revocation, or storing of the digital certificates are performed by the nodes of the blockchain, rather than (or in addition to) the CA. A digital certificate is validated only after multiple blockchain nodes pass a consensus verification, approving the node to be linked to the blockchain. Similarly, a digital certificate is revoked only when multiple blockchain nodes pass a consensus verification, approving revocation of digital certificate of the node. Further, the validity (or revocation) of the blockchain nodes is stored in multiple nodes, rather than only on a CA. Accordingly, even if a node or the CA is attacked by a hacker, the hacker cannot arbitrarily issue, revoke, or manipulate validity of digital certificates of the blockchain nodes without receiving an approval of blockchain nodes.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, the method comprising:
   receiving, by one or more processors, a linking request from a first node requesting to be linked to a blockchain network, the linking request comprising a to-be-verified digital certificate indicating identity information of the first node, wherein the to-be-verified digital certificate comprises one or more of a validity period of the to-be-verified digital certificate or a version number of the to-be-verified digital certificate;
   receiving, by the one or more processors, a plurality of consensus verification messages from a plurality of blockchain nodes of the blockchain network, each consensus verification message indicating whether a respective blockchain node of the plurality of blockchain nodes approves or denies the linking request, wherein each blockchain node of the plurality of blockchain nodes performs a portion of a verification process based on a pre-agreed verification standard, and wherein at least one blockchain node of the plurality of blockchain nodes performs the portion of the verification process by verifying the validity period of the to-be-verified digital certificate or by verifying the version number of the to-be-verified digital certificate;
   determining, by the one or more processors, that a total number of the plurality of consensus verification messages is greater than a first threshold number;
   in response to determining that the total number of the plurality of consensus verification messages exceeds the first threshold number, determining, by the one or more processors, that the linking request is approved by the plurality of blockchain nodes based on a total number of blockchain nodes approving the linking request being greater than a second threshold number; and
   in response to determining that the linking request is approved by the plurality of blockchain nodes, storing, by the one or more processors, the to-be-verified digital certificate in the blockchain network as a digital certificate of the first node;
   wherein the first node provides the linking request based on a private key associated with the first node.

2. A non-transitory, computer-readable medium storing one or more instructions executable by a computer system to perform operations comprising:
   receiving, by one or more processors, a linking request from a first node requesting to be linked to a blockchain network, the linking request comprising a to-be-verified digital certificate indicating identity information of the first node, wherein the to-be-verified digital certificate comprises one or more of a validity period of the to-be-verified digital certificate or a version number of the to-be-verified digital certificate;
   receiving, by the one or more processors, a plurality of consensus verification messages from a plurality of blockchain nodes of the blockchain network, each consensus verification message indicating whether a respective blockchain node of the plurality of blockchain nodes approves or denies the linking request, wherein each blockchain node of the plurality of blockchain nodes performs a portion of a verification process based on a pre-agreed verification standard, and wherein at least one blockchain node of the plurality of blockchain nodes performs the portion of the verification process by verifying the validity period of the to-be-verified digital certificate or by verifying the version number of the to-be-verified digital certificate;
   determining, by the one or more processors, that a total number of the plurality of consensus verification messages is greater than a first threshold number;
   in response to determining that the total number of the plurality of consensus verification messages exceeds the first threshold number, determining, by the one or more processors, that the linking request is approved by the plurality of blockchain nodes based on a total number of blockchain nodes approving the linking request being greater than a second threshold number; and
   in response to determining that the linking request is approved by the plurality of blockchain nodes, storing, by the one or more processors, the to-be-verified digital certificate in the blockchain network as a digital certificate of the first node;
   wherein the first node provides the linking request based on a private key associated with the first node.

3. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
   receiving, by one or more processors, a linking request from a first node requesting to be linked to a blockchain network, the linking request comprising a to-be-verified digital certificate indicating identity information of the first node, wherein the to-be-verified digital certificate comprises one or more of a validity period of the to-be-verified digital certificate or a version number of the to-be-verified digital certificate;
   receiving, by the one or more processors, a plurality of consensus verification messages from a plurality of blockchain nodes of the blockchain network, each consensus verification message indicating whether a respective blockchain node of the plurality of blockchain nodes approves or denies the linking request, wherein each blockchain node of the plurality of blockchain nodes performs a portion of a verification process based on a pre-agreed verification standard, and wherein at least one blockchain node of the plurality of blockchain nodes performs the portion of the verification process by verifying the validity period of the to-be-verified digital certificate or by verifying the version number of the to-be-verified digital certificate;

determining, by the one or more processors, that a total number of the plurality of consensus verification messages is greater than a first threshold number;

in response to determining that the total number of the plurality of consensus verification messages exceeds the first threshold number, determining, by the one or more processors, that the linking request is approved by the plurality of blockchain nodes based on a total number of blockchain nodes approving the linking request being greater than a second threshold number; and in response to determining that the linking request is approved by the plurality of blockchain nodes, storing, by the one or more processors, the to-be-verified digital certificate in the blockchain network as a digital certificate of the first node;

wherein the first node provides the linking request based on a private key associated with the first node.

* * * * *